United States Patent [19]
Glorieux

[11] Patent Number: 5,399,189
[45] Date of Patent: Mar. 21, 1995

US005399189A

[54] ANTI-CORROSIVE PROTECTIVE COMPOSITION

[75] Inventor: Hugo A. M. Glorieux, Gent, Belgium

[73] Assignee: GEHA, naamloze vennootschap., Gent, Belgium

[21] Appl. No.: 75,530

[22] PCT Filed: Dec. 11, 1991

[86] PCT No.: PCT/BE91/00087

§ 371 Date: Jun. 17, 1993

§ 102(e) Date: Jun. 17, 1993

[87] PCT Pub. No.: WO92/11324

PCT Pub. Date: Jul. 9, 1992

[30] Foreign Application Priority Data

Dec. 17, 1990 [BE] Belgium ............................ 9001204

[51] Int. Cl.6 .................... C08K 7/16; C08J 9/18; C08J 9/22

[52] U.S. Cl. .................. 106/14.41; 106/14.42; 106/14.44; 521/50; 521/56; 521/134; 521/145; 523/218; 523/200

[58] Field of Search ............... 106/14.42, 14.41, 14.44; 428/402, 407; 521/50, 56, 134, 145; 523/218, 200; 524/81, 186

[56] References Cited

U.S. PATENT DOCUMENTS

| 4,148,955 | 4/1979 | Breitenfellner et al. | 428/143 |
| 4,185,000 | 1/1980 | Gebauer et al. | 427/195 |
| 4,307,142 | 12/1981 | Blitstein et al. | 428/143 |
| 4,318,998 | 3/1982 | Berglund | 521/54 |
| 4,374,874 | 2/1983 | Blitstein et al. | 427/379 |
| 4,403,048 | 9/1983 | Blitstein et al. | 523/218 |

FOREIGN PATENT DOCUMENTS

0026388 4/1981 European Pat. Off.
WO80/02846 12/1980 WIPO.

OTHER PUBLICATIONS

*World Patents Index Latest*, Section Ch, Week 8547, Derwent Publications Ltd., Oct. 1985.

*Primary Examiner*—Anthony Green
*Attorney, Agent, or Firm*—Foley & Lardner

[57] ABSTRACT

Anti-corrosive protective compositions for metal. The composition contains a curable binder, which after curing has low water and oxygen permeability, and at least one filler composed of solid parts, characterised in that the filler contains expanded polymer parts with a size of 1 to 100 micrometer.

8 Claims, No Drawings

ANTI-CORROSIVE PROTECTIVE COMPOSITION

The present invention concerns an anti-corrosive protective composition for metal. The composition contains a curable binder, which after curing has low-water and oxygen permeability, and at least one filler composed of solid parts.

Such compositions are used to avoid or to slow down the oxidation of easily oxidizable metals, especially iron and steel. These compositions are applied in a liquid or powder form and harden on the metal's surface.

Rust formation on iron and steel is mainly the result of the formation of innumerable anodes and cathodes on the surface of the metal when it is exposed to oxygen and moisture.

We can find an example of the formation of microbatteries on metal surfaces which are only partly protected and are therefore unequally subjected to the influence of weather-circumstances. On the parts with a high oxygen concentration, cathodes are formed. On the parts with a low oxygen concentration, anodes are formed. The present electron theory shows that these microbatteries are the cause of corrosion. An electrochemical tension appears between the electrodes, so that hydrogen is formed at the cathodes while iron dissolves at the anodes.

The most obvious protection against corrosion consists of the application of a water- and gas impermeable coating on the metal surface. This principle of metal protection is known as the "barrier effect," and all existing anti-corrosive compositions are in a certain way based on this "barrier effect."

The fillers are know compositions of the preceding kind and are inert or mostly active pigments. Active pigments, materials which form combinations with oxygen and moisture to slow down the noxious influence of oxygen and moisture on the metal, improve the protection. These active pigments are mostly composed of lead, chromium, barium, molybdenum, zinc, calcium, strontium or phosphates. The activity of these pigments is limited in time, among other things, because of their reaction with water and oxygen. Moreover, most of these pigments are harmful for the environment, therefore their use will be increasingly limited.

Inert or active pigments are the classic pigments. Although, there is a preference for lamellar and inert materials such as aluminum silicate, magnesium silicate, magnesium aluminium silicate, iron-magnesium aluminium silicate, aluminium powder, zinc dust, barium sulphate, quartz, iron oxide, ritanium dioxide, etc.

Some of these minerals can already be treated with polymers, such as epoxy or silanes, in order to obtain better adhesion to the binder.

These minerals have sufficient water- and gas impermeability. However, if the adhesion of the binder on their surface is not good, a space is formed in which water accumulates, forming the so-called water bags. To prevent the formation of such water bags, thus preventing the permeability of the coating, some minerals are consequently treated.

Besides these pigments the known compositions usually contain other fillers, namely to reduce cost and possibly some solvents which facilitate the application of the coating on the metal surface.

It is generally accepted that a good anti-corrosive protective coating should be as dense as possible. In other words, any hollow space, no matter how small, should be avoided as these spaces drastically reduce the protective quality of the coating.

In order to obtain these properties, the known compositions are composed of a very strong ramificated polymer binder which adheres remarkably, preferably to fillers treated with adhesion promoters. Thus, the formation of hollow spaces in the cured coating is avoided at all costs. To prevent porosity in the coating, pigments and fillers are added in a lower volume concentration than the binder. In other words, the pigment volume concentration is lower than the critical pigment volume concentration of the composition.

The good, anti-corrosive, protective compositions, which are known, are therefore relatively expensive.

The object of the present invention is to remedy this disadvantage and to supply an anti-corrosive protective composition for metals which provides excellent protection, but nevertheless is relatively cheap.

To this end the fillers contain expanded polymer parts with a size of 1 to 100 micrometers.

The inventor has surprisingly found that not only the use of polymer microparts in an anti-corrosive protective coating is possible, but that, moreover, the use of these microparts considerably improves the corrosion resistance of the coating, reduces the blister formation, lowers the salt formation of some pigments, increases the adhesion and results in compositions having properties previously unknown.

There are expanded vinylidene chloride-acrylonitrile copolymer microspheres available on the market under the name Expancel ®.

Applications of these microspheres are described in "Polymers Paint Colour Journal" of Nov. 27, 1985 and Jul. 23, 1986.

These expanded organic microspheres are usually used in water-based compositions such as decorative water-thinable interior housepaints. The intention is mainly to reduce the price and the density and to improve the applicability. Exterior use of these microspheres is not recommended, because of the sensitivity to U.V.-rays.

Consequently, it does not seem advisable for a professional to rely on such microspheres as a filler in an anti-corrosive protective composition.

Generally speaking, a professional using expanded polymer microparts would expect the same disadvantages with microspheres or microparts of another material, namely the formation of hollow spaces in the cured composition.

Through these spaces, gasses and vapors can move freely, subsequently decreasing the protective activity of the composition which relies just on the formation of a water- and gas impermeable protective layer. Watervapor, which can damage the composition by fast evaporation or freezing, may also accumulate in these spaces. These spaces also cause a strong decrease in the mechanical and chemical resistance of the composition.

A protective composition comprising hollow polymeric particles is disclosed in EP-A-O 026 388. This composition, however, is not an anti-corrosive composition. Rather it is a protective composition, forming a relatively thick, tough elastic layer on an anti-corrosive coating for protecting said coating against mechanical influences such as projected stones. Moreover, this document does not mention that the hollow polymeric particles, which are added in relatively high proportions to decrease the density and weight of the layer, are expanded particles.

World Patent Index, Section Cn, week 8547, class A., AN 85-29396J, discloses two compositions for a multi-layer coating comprising a binder and filler which may be formed by mineral expanded hollow particles. These particles are not polymeric particles. The layers are high temperature resistant. Corrosion resistance is obtained by adding a rust proofing agent.

In a particular embodiment of the invention the expanded polymers are microspheres, particularly hollow microspheres.

Especially for anti-corrosive protective coatings for metal, a prejudice exists against the use of polymer microspheres. These compositions are usually susceptible to weather influences. For instance, it is generally accepted that a coating with expanded polymerates as a filler is not weather-resistant, has insufficient mechanical properties and does not fulfill its protective function satisfactorily because of its porosity. In this embodiment, thanks to the addition of the expanded polymer microspheres, it is possible to obtain compositions, with such anti-corrosive properties, which cannot be obtained without the use of these parts or by using conventional fillers.

In a useful embodiment of the invention, the composition contains 0.05 to 6 wt % expanded polymer parts, calculated on the total wt % of the composition before curing.

In a particularly useful embodiment of the invention, the polymeric particles parts are obtained from vinylidene chloride-acrylonitrile copolymer.

Other particularities and advantages will appear from the following description of an anti-corrosive protective composition according to the invention. This description is only given as example and does not limit the invention.

An anti-corrosive protective composition according to the invention consists of a curable binder and 0.05 to 6 wt %, calculated on the total weight of the composition before curing and hollow microspheres with a size of 1 to 100 micrometer of an expanded polymer. Very useful are the microspheres with a diameter between 1 and 100 micrometer.

A very suitable polymer is vinylident chloridea-crylonitrile compolymer. Such a suitable copolymer in the form of microspheres with the desired size is on the market under the name EXPANCEL® (more specially the type DE 12 of the Swedish company Expancel).

The blowing agent used for expansion is still present in the hollow microspheres.

Besides the necessary chemical and mechanical properties the used binders will also have a low water- and oxygenpermeability. Silicate, epoxy and polyurethane are most suitable for these applications. Nevertheless, other binders such as alkyd, styrene, chlorinated rubber, vinyl and some dispersions can also be used successfully.

Among other things, silicates are very useful for welding primers because of their inorganic nature. Epoxy and polyurethane are very suitable as binders since they harden as a result of chemical polymerization. As a result, a strong ramificated and extremely dense polymer network can be obtained. A strong ramificated polymer network is hard and closed and therefore extremely water and gas impermeable.

Besides these expanded polymer parts, the usual ingredients for anti-corrosive, protective compositions (such as plasticizers, pigments, other fillers, catalysts, products for improving the adhesion, anti-oxidants, hardeners, viscosity modifying products, etc.) can be added to the binder.

For example, the anti-corrosive, protective composition is especially useful as an anti-corrosive coating for iron or steel.

This composition can be applied in liquid or powder form, whereafter it will harden to the desired hardness.

For the application in liquid form, one or more solvents, and possibly dispersing agents, may be added to the binder.

The present invention will be illustrated in more detail with the following examples of compositions. In comparison, a few reference compositions not based on the invention will also be given.

REFERENCE A

A zinc rich, anti-corrosive primer, based on a polyurethane binder and obtained by mixing in a dissolver of:

721 parts by weight MDI polyurethane prepolymer containing 16 wt % free —NCO groups;
7856 parts by weight zinc dust with a particle size of 2.8 to 3.2 micrometer;
44 parts by weight bentonite type treated montmorilonite (BENTONE 34);
1379 parts by weight solvent (SOVESSO 100).

EXAMPLE 1

Reference A is repeated, except that 160 parts by volume zinc dust is replaced by 160 parts by volume hollow expanded microspheres of vinylidene chloridea-crylonitrile copolymer, having an average size of 12 micrometer (EXPANCEL ® 551 DE 12).

EXAMPLE 2

Reference A is repeated, except that 330 parts by volume zinc dust is replaced by 330 parts by volume Expancel® 551 DE 12.

EXAMPLE 3

Reference A is repeated, except that 550 parts by volume zinc dust is replaced by 550 parts by volume Expancel® 551 DE 12.

REFERENCE B

An anti-corrosive micaceous iron oxide surfacer and topcoat based on a polyurethane binder and obtained by mixing in a dissolver of:

2038 parts by weight MDI polyurethane prepolymer containing 16 wt % free-NCO groups;
2125 parts by weight magnesium silicate with an average particle size of 1.2 micrometer;
1426 parts by weight lamellar micaceous iron oxide (Haematite) with a particle size that is 92–94% smaller than 63 icrometer;
437 parts by weight aluminium paste; 65% aluminium non-leafing with a particle size of 45 micrometer in white spirit-solventnaphta;
81 parts by weight bentonite type treated montmorilonite (BENTONE 34);
3893 parts by weight solvent (SOLVESSO 100).

EXAMPLE 4

Reference B is repeated, except that all the fillers (magnesium silicate, micaceous iron oxide and aluminium paste) are replaced by an equal volume of hollow expanded microspheres of vinylidene chloride-acrylonitrile copolymer, with a size of 12 micrometer.

EXAMPLE 5

Reference B is repeated and 60 parts by weight Expancel® 551 DE 12 is added, so that the total pigment volume concentration increases 15.90% compared to reference B.

EXAMPLE 6

Example 4 is repeated and 60 parts by weight Expancel® 551 DE 12 is added, so that the total pigment volume concentration increases 15.90 % compared to Example 4.

REFERENCE C

An anti-corrosive primer, surfacer and topcoat based on a polyurethane-tar combination and obtained by mixing in a dissolver of:
1994 parts by weight MDI polyurethane prepolymer containing 16 wt % free —NCO groups;
1968 parts by weight waterfree tar (CTC 15P30-CINDU);
2931 parts by weight magnesium silicate with an average particle size of 1.2 micrometer;
147 parts by weight bentonite type treated montmorillonite (BENTONE 34);
2960 parts by weight solvent (XYLENE).

EXAMPLE 7

Reference C is repeated and tar and magnesium silicate are replaced by 21 parts by weight of the abovementioned Expancel® 51 DE 12. The total pigment volume concentration therefore increases 7.5% compared to Reference C.

The compositions thus obtained: References A, B, C and the Examples 1 to 7 are applied on untreated, degreased metal plates, in a dry layer of 100 micrometer. In the middle, the Cross of Evans is engraved. The plates are then placed obliquely in a corner of 15 degrees off perpendicular in the saltspray apparatus and are exposed for 500 hours to a salt atmosphere of 5% sodium in water at a temperature of 45 degrees Centigrade.

The test results are represented in the following tables.

TABLE

|  | REF A | EX. 1 | EX. 2 | EX. 3 |
|---|---|---|---|---|
| Rust stains on the surface | 10 | 10 | 10 | 10 |
| Rust spots on the metal | 10 | 10 | 10 | 10 |
| Rust in the cross | 10 | 10 | 10 | 10 |
| Blisters in the cross | 10 | 10 | 10 | 10 |
| Blisters on the surface | 4 | 5 | 6 | 9 |
| Formation of zinc salts | 2 | 4 | 6 | 8 |
|  | REF B | EX. 4 | EX. 5 | EX. 6 |
| Rust stains on the surface | 4 | 6 | 8 | 9 |
| Rust spots on the metal | 7 | 9 | 9 | 10 |
| Rust in the cross | 5 | 4 | 6 | 5 |
| Blisters in the cross | 7 | 6 | 9 | 7 |
| Blisters on the surface | 8 | 8 | 8 | 8 |
| Formation of zinc salts | — | — | — | — |
|  | REF C | EX. 7 |  |  |
| Rust stains on the surface | 10 | 10 |  |  |
| Rust spots on the metal | 10 | 10 |  |  |
| Rust in the cross | 6 | 6 |  |  |
| Blisters in the cross | 10 | 10 |  |  |
| Blisters on the surface | 10 | 10 |  |  |
| Formation of zinc salts | — | — |  |  |

Values:
0 = bad
5 = average
10 = very good

From the tables above the extreme importance of the present invention is obvious. The blister and zinc salt formation on zinc rich paints is strongly counteracted (REF. A, Ex. 1, 2 and 3), the quality of inert pigmented cured compositions is greatly improved (REF. B, Ex. 4, 5 and 6) and it is even possible to replace the high quality but black and environmentally unfriendly tar composition with a tar-free variant (REF. C, Ex. 7).

Of course these good properties are not limited exclusively to moisture-curing polyurethane binders. They can also be obtained with other binders such as silicates, epoxy, styrene, two-component polyurethanes, alkyds, chlorinated rubber, vinyl, silicons and some dispersions. Moreover, the scope of the present invention is not limited to only the embodiments described above. Within the scope of the patent application, many changes can be made to the described embodiments.

I claim:
1. An anti-corrosive composition for metal, which composition comprises:
    (a) a curable binder of polyurethane;
    (b) 0.05 to 6 wt % based on the total weight of the composition before curing, of a filler consisting of hollow expanded microspheres still containing blowing agent used for expansion, having a diameter of 1 to 100 micrometer, of a gas-impermeable thermoplastic organic polymer; and, optionally
    (c) at least one other filler, solvent or additive.
2. The anti-corrosive composition of claim 1, wherein said expanded microspheres are acrylonitrile copolymer microspheres.
3. The anti-corrosive composition of claim 1, wherein said expanded microspheres are vinylidene chloride copolymer microspheres.
4. The anti-corrosive composition of claim 1, wherein said other filler is zinc.
5. The anti-corrosive composition of claim 1, wherein said other filler is a silicate.
6. The anti-corrosive composition of claim 1, wherein said other filler is aluminum.
7. The anti-corrosive composition of claim 1, wherein said other filler is an iron-oxide.
8. The anti-corrosive composition of claim 1, wherein said expanded microspheres are polyvinylidene chloride acrylonitrile copolymer microspheres.

* * * * *

UNITED STATES PATENT AND TRADEMARK OFFICE
CERTIFICATE OF CORRECTION

PATENT NO. : 5,399,189

DATED : March 21, 1995

INVENTOR(S) : Hugo A. M. GLORIEUX

It is certified that error appears in the above-identified patent and that said Letters Patent is hereby corrected as shown below:

Column 6, line 36, delete "of polyurethane"

Signed and Sealed this

Twenty-ninth Day of August, 1995

Attest:

BRUCE LEHMAN

Attesting Officer     Commissioner of Patents and Trademarks